United States Patent [19]

McMurtry

[11] 4,384,332
[45] May 17, 1983

[54] NUMERICALLY CONTROLLED MACHINE TOOL

[75] Inventor: David R. McMurtry, Wotton-under-Edge, England

[73] Assignee: Renishaw Electrical Limited, Wotton-under-Edge, England

[21] Appl. No.: 198,267

[22] Filed: Oct. 17, 1980

[30] Foreign Application Priority Data

Oct. 23, 1979 [GB] United Kingdom ............. 7936634

[51] Int. Cl.³ ............................................ G06F 15/46
[52] U.S. Cl. ................................. 364/474; 318/570
[58] Field of Search ............ 364/474, 475; 318/561, 318/567–569, 578, 570, 573; 219/124.31

[56] References Cited

U.S. PATENT DOCUMENTS

| | | | |
|---|---|---|---|
| 3,914,678 | 10/1975 | Chynoweth | 318/600 X |
| 4,053,819 | 10/1977 | Matsumoto | 318/569 X |
| 4,118,871 | 10/1978 | Kirkham | 364/474 X |
| 4,131,837 | 12/1978 | Whetham | 364/474 X |
| 4,195,250 | 3/1980 | Yamamoto | 318/561 |

Primary Examiner—Mark E. Nusbaum
Assistant Examiner—Michael R. Fleming
Attorney, Agent, or Firm—Spencer & Kaye

[57] ABSTRACT

A method and apparatus for measuring a dimension of a workpiece mounted on a numerically controlled machine tool having a probe for sensing the surface of the workpiece, an automatic means for moving the probe relative to a datum, the automatic means including a first measuring means for producing a signal defining units of distance corresponding to the relative movement of the probe with respect to the datum, and a second measuring means coupled to the first measuring means for accumulating a count corresponding to the relative movement of the probe in respect to the datum. The actual position of the workpiece surface is determined relative to a nominal position thereof, the nominal position being at a known distance from the datum. According to the method the probe is moved to a first position which is one of the actual and nominal positions of the workpiece surface. Operation of the second measuring means is initiated to begin a count of the units of distance defined by the signal from the first measuring means when the probe attains the first position. The probe is then moved to a second position which is the other of the actual and nominal positions of the workpiece surface. The count in the second measuring means is terminated when the probe attains the second position. The count accumulated by the second measuring means on termination thereof defines the actual distance of the workpiece surface from the nominal position.

14 Claims, 8 Drawing Figures

NUMERICALLY CONTROLLED MACHINE TOOL

BACKGROUND OF THE INVENTION

This invention relates to a numerically controlled machine tool.

Such machines are known to have a control unit comprising a positioning system including programme-controlled means for outputting position demand data to a motor for driving a tool slide of the machine and means for generating position feedback data from a means for continually measuring the position of the slide, means for manually updating the position demand data by small amounts to make it possible to correct errors in the position of the tool, and a programme-controlled facility for outputting miscellaneous function signals for operations ancillary to the tool positioning operations.

Further, it is known to provide such machines with the facility to perform measuring operations on a surface of the workpiece. To this end the machine is provided with means for automatically replacing the tool by a probe adapted to sense said surface and to provide an output of such sensing. Said positioning system is used to move the probe into a sensing relationship with said surface, and the control unit includes a computer for automatically correlating the probe output with data of the positioning system with a view to (a) determining the position of the surface, (b) determining said error, and (c) updating the position demand data.

It is often desirable to provide an automatic measuring facility in machines not originally equipped in this way but there is a difficulty in doing so essentially because it is not readily possible to gain access to the control unit of the machine for the purpose of said correlation, error determining and updating operations.

SUMMARY OF THE INVENTION

It is an object of this invention to provide a method of and apparatus for overcoming that difficulty.

A known probe used for the purposes of the invention may comprise a stylus supported by a housing for movement between a rest position and a position in which the stylus is displaced from the rest position and relative to the housing by engagement between the stylus and said surface.

It is a more specific object of this invention to provide a method of and machine for determining said error by use of a so-called "touch-probe", i.e. a probe whose output is defined by a pulse signal occurring substantially when the stylus of the probe makes or breaks contact with said surface.

It is another more specific object of this invention to provide a method of and machine for determining the relationship between said error and a tolerance within which said error is required to lie, the method and apparatus being applicable regardless of whether the probe is a said touch probe or a so-called "measuring probe", i.e. a probe having an output which varies according to the magnitude of displacement of the stylus due to a said engagement.

According to this invention there is provided a method of measuring a workpiece in a numerically controlled machine tool having a probe for sensing a surface of the workpiece and having automatic means for moving the probe relative to a datum; the method comprising providing a second measuring means and automatically and sequentially performing the steps of moving the probe to a first position, initiating operation of the second measuring means responsive to the probe attaining the first position, moving the probe to a second position, and terminating the operation of the second measuring means responsive to the probe attaining the second position; wherein one of said first and second positions is known relative to said datum by virtue of the first measuring means and is a nominal position of the surface, the other one of the first and second positions is the position at which the probe senses the surface and is the actual position of the surface, and the content of the second measuring means on termination of the operation thereof defining the actual position of the surface in terms of its distance from the nominal position.

The expression "unknown position" means a position lying within a known region but whose exact position in that region is unknown. Said first position may be said known position in which case the known position lies close to or within said region and the probe is moved in the direction in which the unknown position is likely to be. Alternatively, the first position may be the unknown position in which case the probe is at first moved through said region until the surface is sensed and is thereafter moved in the direction toward the known position.

The expression "nominal position" refers to a particular position which the surface is ideally required to have. The nominal position lies within a tolerance, i.e. within a range of positions over which the actual position may vary.

Also according to this invention there is provided a numerically controlled machine tool adapted to perform a measuring operation on a surface of a workpiece, comprising a probe having means for sensing the surface, automatic means for moving the probe between a known position defined in the automatic means in terms of a distance from a datum and an unknown position at which the probe senses the surface and which is the actual position of the surface, the automatic means including a first continually operative measuring means for measuring the movement of the probe relative to said datum, and the machine tool comprising second measuring means arranged to measure said movement of the probe, means responsive to the probe attaining one of said positions for initiating operation of the second measuring means, and means responsive to the probe attaining the other one of said positions for terminating the operation of the second measuring means; all whereby to determine data defining the actual position of the surface relative to the known position.

DESCRIPTION OF THE PREFERRED EMBODIMENTS

Figure 1:
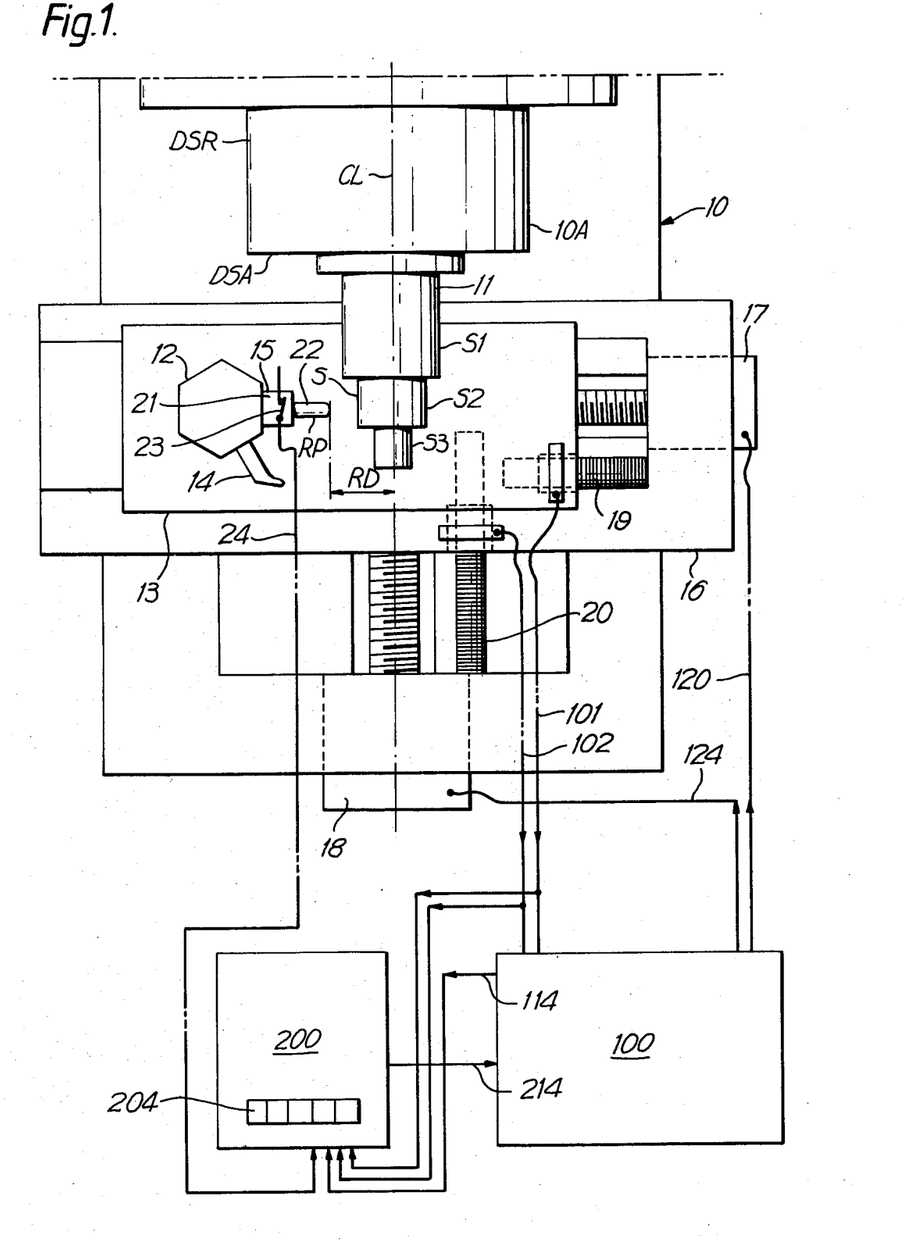
FIG. 1 is a plan view of a numerically controlled machine tool.

The machine, generally denoted 10 in FIG. 1, is a lathe having a chuck 10A holding a workpiece 11. A tool head 12 mounted on a cross-slide 13 of the lathe supports a number of cutting tools 14 and a probe 15. The cross-slide 13 is mounted on an axial slide 16. The slides 13,16 are movable by respective motors 17,18 for the coordinate positioning of the tools 14 and the probe 15. The slides 13,16 have respective feedback generators 19,20 each comprising a pair of diffraction gratings producing moving Moire fringes readable by a reading head to produce respective pulse signals 101,102. The cycle between two successive pulses 101 or 102 corresponds to a unit distance, in this example 0.001 mm, moved by the respective slides 13 or 16. A count of a sequence of pulses 101 or 102 corresponds to a given total distance moved by the slides 13 or 16.

The movement of the slides is controlled by a control unit 100 which is known per se and is normally supplied to the user together with the machine 10. However, a rudimentary example of the unit is now described, additional reference being directed to FIG. 2.

Figure 2:
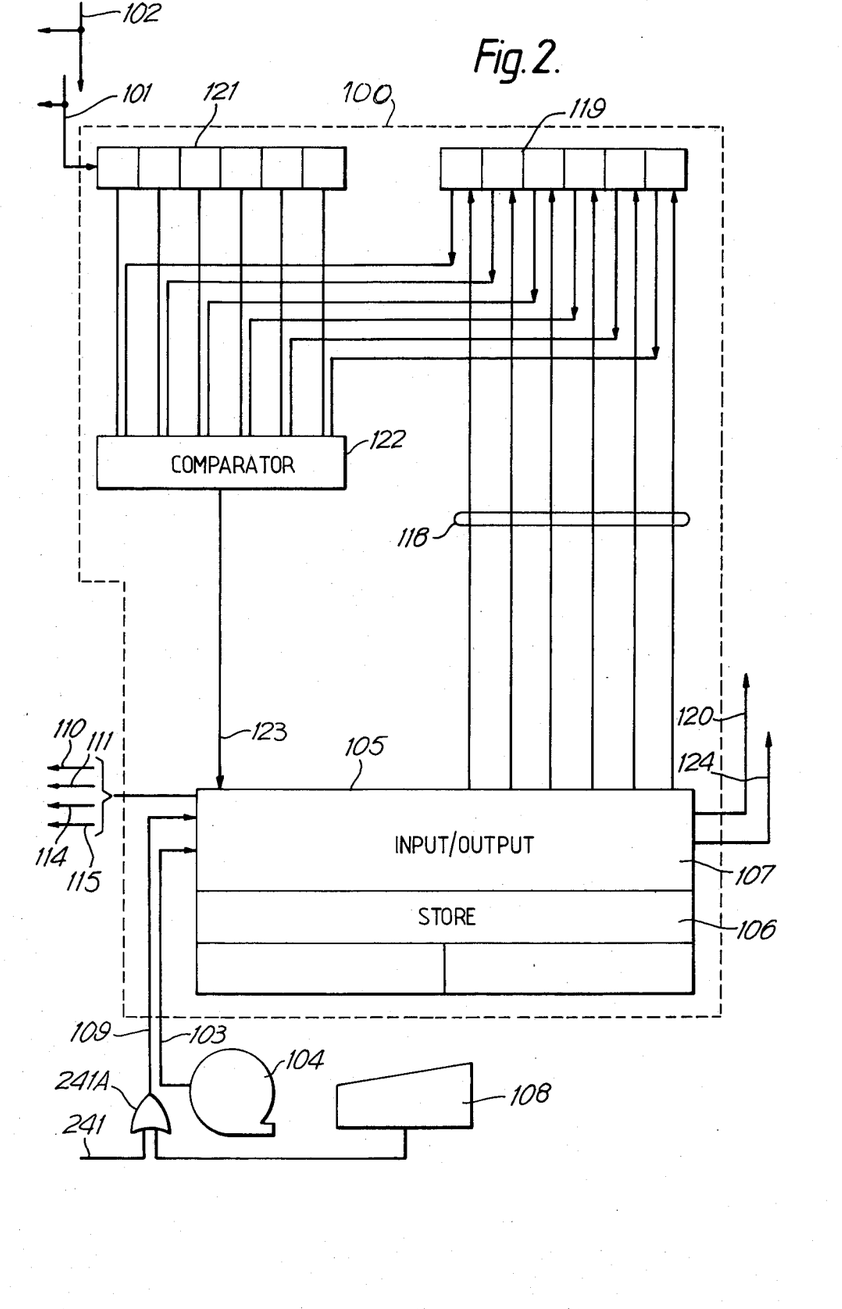
FIG. 2 is a system diagram of a first control unit of the machine tool.

The unit 100 comprises a computer 105 fed by an external programme 103 derived from a tape 104 and including a usual store 106, input/output facility 107, and manual input means such as a keyboard 108. The computer 105 has the known facility for outputting miscellaneous function signals provided for in the programme 103. Four such signals, denoted 110,111,114,115, are used for the purposes of this invention. Further, the programme 103 contains instructions for moving the slides 13,16 into given coordinate positions for the purpose of machining operations to be performed by the tools 14 or measuring operations to be performed with the aid of the probe 15. If, say, the slide 13 is to be moved so that the probe 15 attains a position RP having a distance RD from the centre line CL of the chuck 10A, then the distance RD is specified in the programme 103. In operation the distance RD is transferred by the computer 105 as a signal 118 to a register 119, and the computer 105 also outputs a signal 120 to the motor 17 to move the slide 13 in the requisite sense which is regarded as positive if the movement is away from the line CL. The sense in which the motor 17 has to operate is known from a counter 121 connected to be cycled by the pulse signal 101. The counter is set such that, when the distance RD=0, the content of the counter is zero. The counter counts upwards for positive movement and vice versa. The content of the counter 121 is compared with the content of the register 119 at a comparator 122 which outputs a signal 123 which is zero when the contents of the register 119 and counter 121 are the same. The signal 123 is read by the computer 105 which responds to slow and eventually to stop the motor 17 at the correct position. Instead of using the line CL as a zero datum, a suitable surface e.g. a circular periphery DSR of the chuck 10A may be used as a datum. As regards moving the slide 16, a system corresponding to that described for the slide 13 is used, the output to the motor 18 being a signal 124 and the datum being for example a surface DSA on the chuck 10A.

The keyboard 108 may be used to produce a correction signal 109 defining a value to be entered into the store 106 and to be added by the computer 105 to the signal 118 for the purpose of correcting the value of the signal 118 defined in the programme 103. The correction value may be constituted by a signal 241 entered into the store 106 automatically through an OR gate 241A.

The probe 15 comprises a housing 21 secured to the head 12 and a stylus 22 supported on the housing 21 in a rest position thereon. The stylus 22 is displaceable from the rest position when the slide 13 is moved to bring the stylus into engagement with the workpiece 11. Such displacement causes opening of an electrical switch 23 at the instant of the engagement thereby to generate a probe signal 24 in the form of a single pulse. Such probes are known per se.

Figure 3:
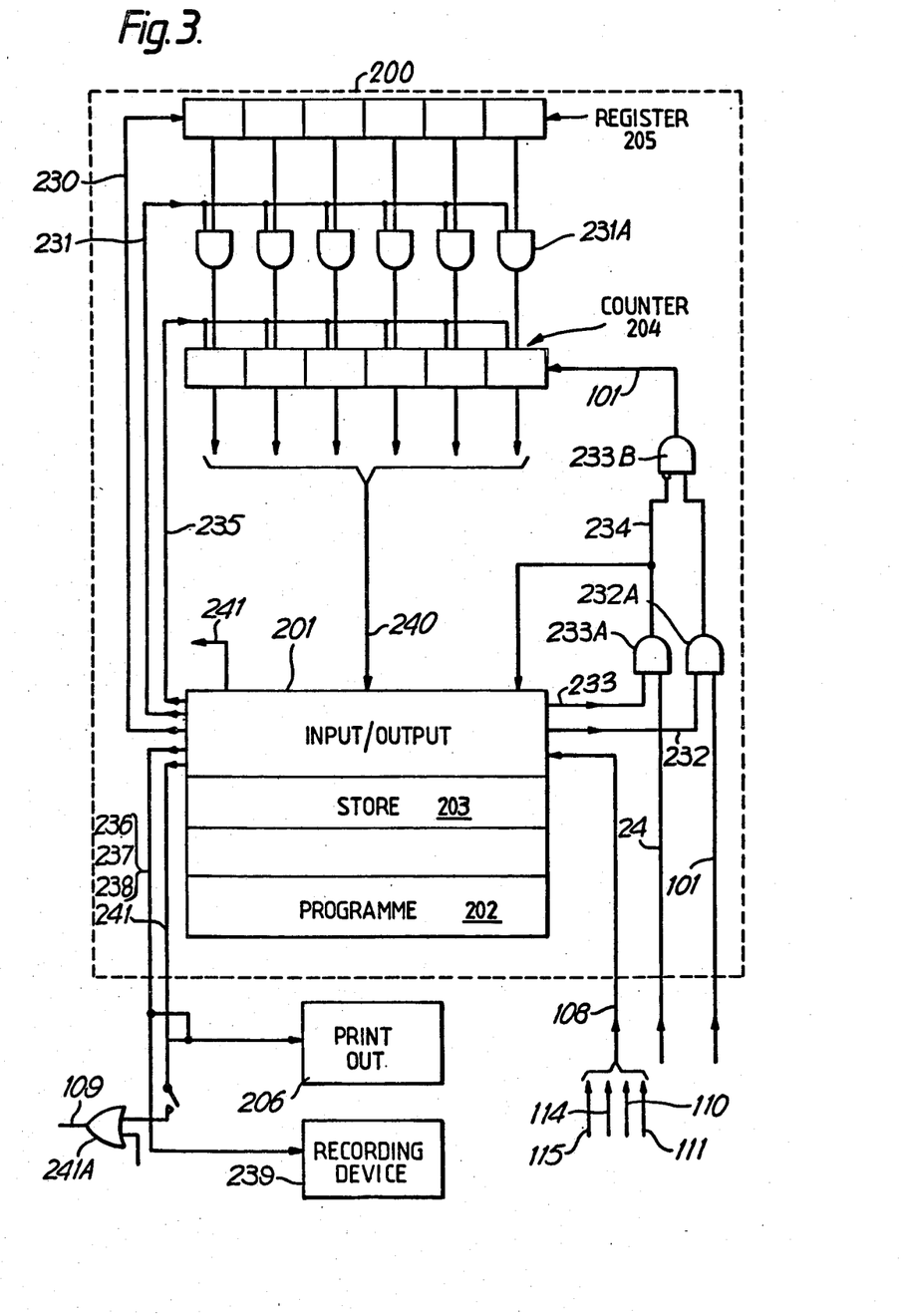
FIG. 3 is a system diagram of a second control unit of the machine tool.

In addition to the first control unit 100 there is introduced a novel second control unit 200, shown schematically in FIGS. 1 and 3, comprising a microprocessor 201 including a hard-wired programme 203, a data store 202, a binary counter 204 and a binary register 205. Further the unit 200 is linked to a print-out 206. The programme 203 is adapted to read the signals 110,111,114,115 and is adapted to output the following signals:

(a) a signal 230 for loading a given number into the register 205,
(b) a signal 231 connected to AND gates 231A for loading the contents of the register 205 into the counter 204.
(c) a signal 232 connected to an AND gate 232A for connecting the position feedback signal 101 to the counter 204 for the latter to count the cycles of the signal 101 and thereby the distance moved by the slide 13 so long as the signal 232 is on.
(d) a signal 233 connected to an AND gate 233A to produce a signal 234 connecting the probe signal 24 to an AND gate 233B for disconnecting the signal 101 from the counter 204 and thereby stop the count.
(e) a signal 235 for zeroing the counter.
(f) signals 236,237,238 for outputting information to a peripheral recording device 239.
(g) the above-mentioned correction signal 241.

The programme 203 is adapted to read a signal 240 which is the instantaneous content of the counter 204, this reading being done responsive to a reading of the signal 234, i.e. the content of the counter is read when the probe 15 engages the workpiece 11.

It is to be understood that the register and counter 205, 204 are duplicated in respect of the signal 102 so that the signals 101,102 may be counted and processed separately. However, it is sufficient to describe the system with reference to the signal 101.

The programmes 103,203 will now be described with reference to FIGS. 4 and 5A to 5D. The flow diagram shown in FIGS. 5A to 5D is arranged in two columns being, respectively, the programmes 103,203 and a time scale T is shown for reference.

Figure 4:
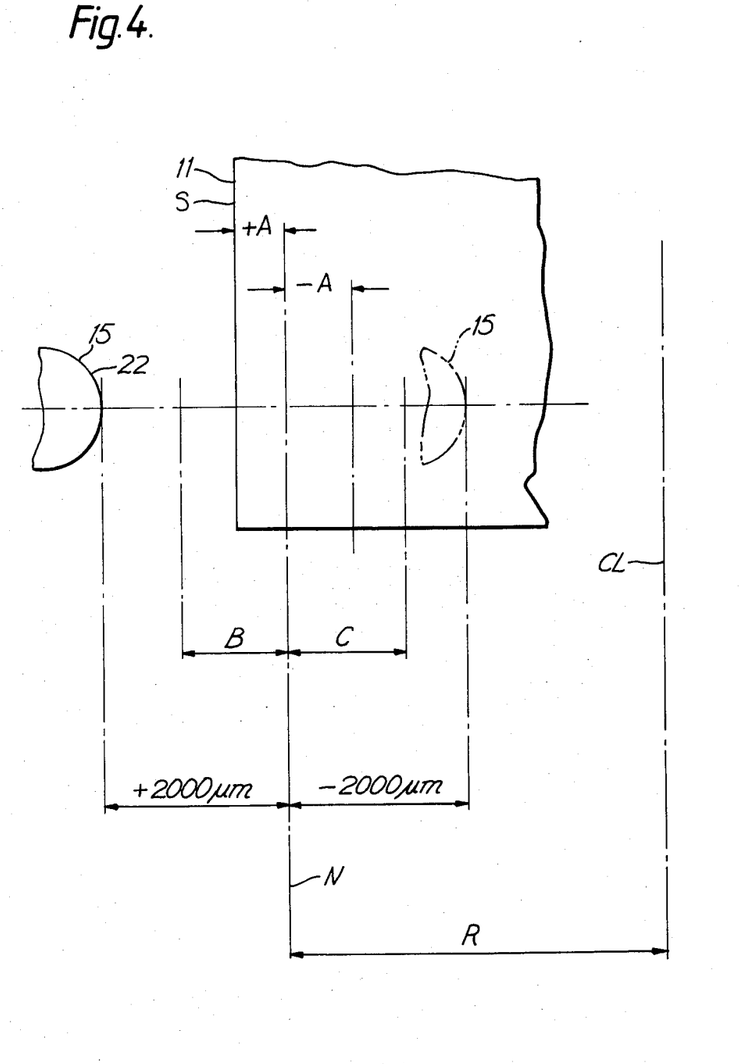
FIG. 4 is an enlarged detail of FIG. 1.

Referring to FIG. 4, the programme 103 is designed for measuring a surface S which is one of the three surfaces S1, S2, S3 of the workpiece 11 in FIG. 1, and is part of an overall programme, defined on the tape 104, containing instructions for machining as well as measuring. The programme 103 is arranged to output the measuring instructions following a machining operation on the surfaces S1,S2,S3, and this may be succeeded by a further machining operation of the same surfaces if the first machining was not sufficient. The instructions for the machining operations are not described as these are well understood per se. The programme 103 may proceed directly from a prior machining operation or it may be started manually following a programmed stop of the machining instructions.

The programmes 103,203 have the following identifiers and variables:

Programme 103

110 = external measurement. (misc. function signal)
111 = internal measurement. (misc. function signal)
114 = intermediate interrupt. (misc. function signal)
115 = terminal interrupt (misc. function signal)
118 = position demand signal.
S(i) = surface to be measured.
N(i) = the nominal or required position of the surface S, i.e. a position between the limits of tolerance.
B(i) = maximum limit of tolerance for positive error.
C(i) = maximum limit of tolerance for negative error.
i = serial number of a programme cycle.
n = last programme cycle.

Programme 203

230 = content of, and signal to load, the register 205.
231 = signal to load counter 204.
232 = signal to enable signal 101 (102).
233 = signal to enable probe 15.
235 = signal to set counter 204 to zero.
236 = 'pass' signal.
237 = 'salvage' signal.
238 = 'scrap' signal.
240 = content of counter 204.
241 = correction value.
±A(i) = error, i.e. distance between the actual position of the surface S and the nominal position N of this surface. A is positive if it results in an increase of N and negative if it results in a decrease.
B'(i) = maximum limit for error, i.e. for +A(i).
C'(i) = maximum limit for negative error, i.e. for −A(i).
D(i) = pass value, i.e. +A is less than B' and −A is less than C'.
E(i) = salvage value of A, i.e. +A is greater than B'.
F(i) = scrap value of A, i.e. −A is greater than C'.
i = serial number of programme cycle.
n = last programme cycle.

Figure 5A:
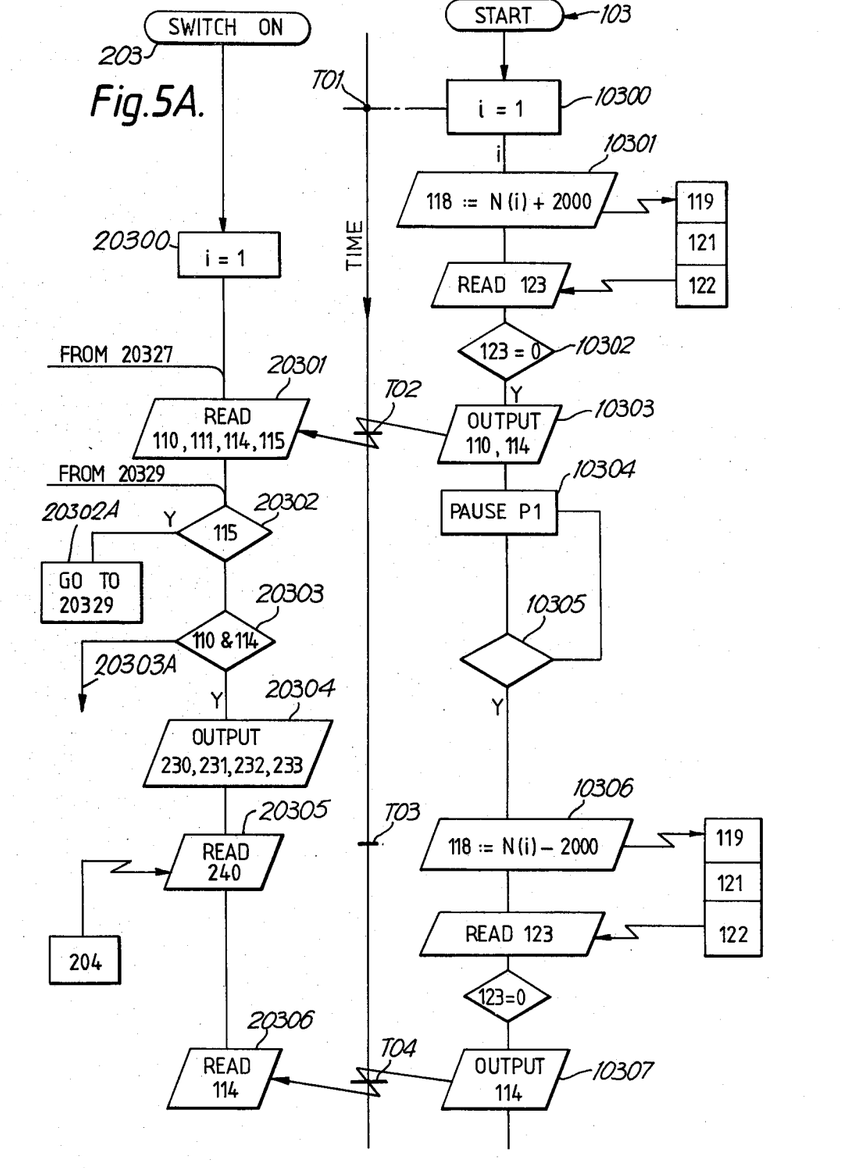
FIGS. 5A to 5D are a flow diagram of certain programmes embodied in the control units.

The programme 103 starts with an operation 10300 setting (i)=1. This operation defines a time point T01 and is followed by an operation 10301 requiring the probe to be moved to a known position N(i)+2000 micrometers i.e. to a position which is 2000 micrometers further from the line CL than the position N(i). The dimension 2000 micrometers is chosen as known to be greater than any likely error A and any other convenient figure may be selected instead of 2000. A decision 10302 monitors the move and completion of the move is followed at time point T02 by an action 10303 to output the signals 110,114 to the unit 200. The action 10303 is immediately followed by or is coincident with the generation of a pause P1 during which no further action takes place in the programme 103. The provision of pauses in a programme is known per se. The duration of the pause is monitored by a decision 10305 which, on completion of the pause, initiates an action 10306 at a time point T03. At the latter point the action 10306 moves the probe to a position N(i)−2000 micrometers followed at time point T04 by an action 10307 to output the interrupt 114 followed immediately by a pause P2 at action 10308.

Referring now to the programme 203, the unit 200 is assumed to be switched-on before the programme 103 becomes activated and the programme 203 has as its first action 20300 the setting of i=1 followed by an action 20301 to read the signals 110,111,114,115, the reading in fact occurring at time point T02. A decision 20302 then checks whether the terminal interrupt 115 has been output. If not, the programme proceeds to a decision 20303 to check whether the signals 110 (external measurement) and 114 have been output. If not, the programme proceeds on a line 20303A as for internal measurement. However, in the present case, with the signal 110 being read, the programme proceeds as for external measurement, this becoming significant later on in the programme. In the first instance, the programme 203 outputs the signals 230,231, 232, 233 at an action 20304 followed by reading of the signal 240 at an action 20305. This prepares the unit 200 for the occurence of the probe signal 24 which may happen at any time after time point T03 during the move of the probe toward the position N(i)−2000 micrometers. The pause P1 is timed to be sufficiently long to enable the programme 203 to reach the action 20305. The number which is loaded into the register 205 is held in the store 202 and is +2000, i.e. the same as the number of micrometers used at action 10301 for positioning the probe relative to the position N(i). The signal 231 loads this number into the counter 204. The latter is adapted to count down to zero when connected to the pulse signal 101. The count-down starts when the probe starts to move at time point T03. It will be clear that if the actual surface of the workpiece lies at position N(i), the counter 204 will read zero when the probe signal 24 occurs. If there is no occurrence of the probe signal 24 by the time the counter reads zero, the counter proceeds to count upwards again but at negative sign. Thus the signal 240 may be positive or negative according to whether the surface S is above or below the position N(i). The subsequent reading of the signal 114 into the unit 200 at an action 20306 initiates an action 20309 to read the signal 240 into store as the variable ±A(i). A decision 20307 checks that the signal 240 has in fact occurred, i.e. that the probe has responded to engagement with the workpiece. If not, an alarm is output at an action 20308. This concludes the measuring phase of the programmes 103,203.

It might be noted that while it is important that the number in the counter 204, i.e. 2000, corresponds exacly to the amount, i.e. 2000 micrometers, by which N(i) is increased for the action 10301, the amount by which N(i) is decreased for the action 10306 is not critical.

Figure 5B:
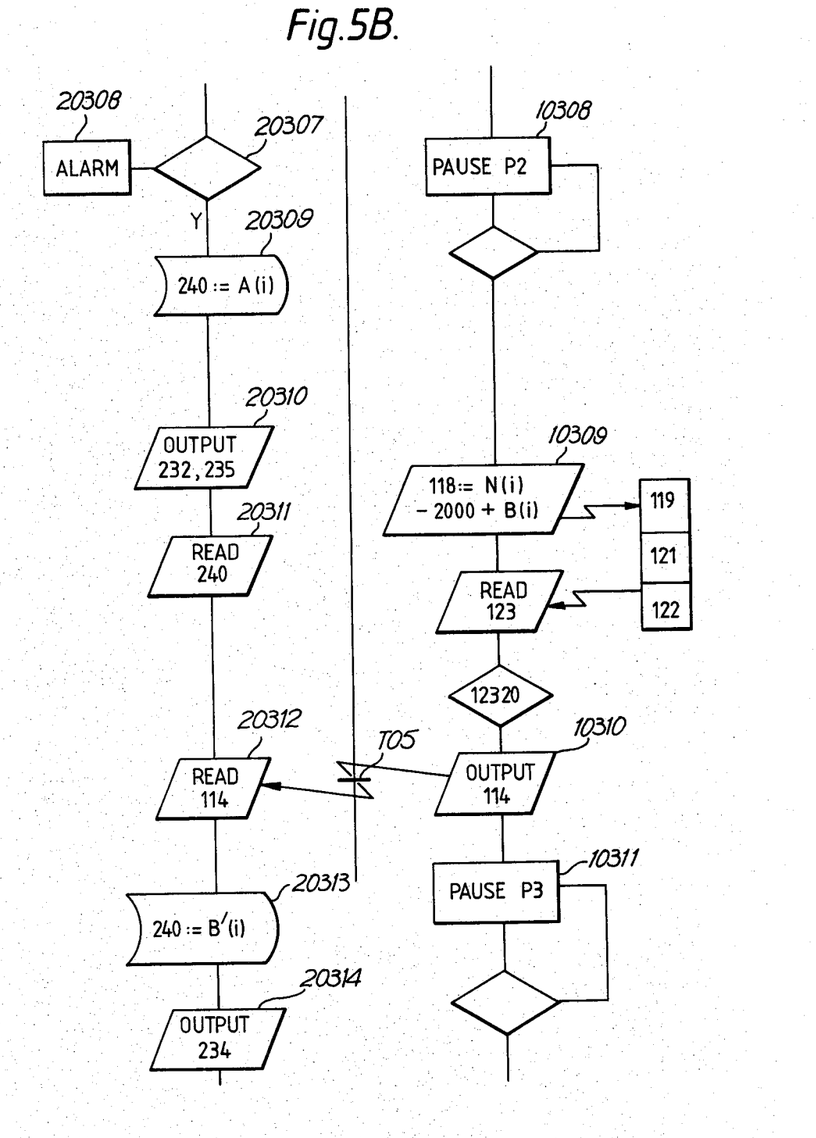

The next phase of the programmes 103,203 is concerned with determining whether or not the error A lies within the limits B or C. To this end the action 20309 is followed by an action 20310 to output the signals 235,232 to zero the counter 204 and enable the signal 101, further followed by an action 20311 to read the signal 240, i.e. to read the counter. The pause P2 is designed to be long enough to enable the programme 203 to reach the action 20311. The pause P2 is followed by an action 10309 to move the probe to a position N(i)−2000 micrometers +B(i). In other words the probe is moved in the positive sense by an amount B(i). The purpose of this is solely to read B(i) into the unit 200 by effecting the counter 204 to read the signal 101 during the move of the probe, i.e. the move of the slide 13. When the move is completed, an action 10310 outputs the interrupt 114 defining a time point T05 followed by a pause P3 at an action 10311. The interrupt 114 is read by the programme 203 at an action 20312 followed by storing of the signal 240 as the variable B'(i) at an action 20313. There now follows the transfer of the variable C(i) from the unit 100 to the unit 200 to become C'(i). This requires in the first instance an action 20314 to output the signal 235 for zeroing the counter 204 and an action 20314A to read this counter. The pause P3 is long enough for the programme 203 to reach the action 20314A. Thereafter the programme 103 has an action 10312 to move the probe in the positive direction by the amount C(i). On completion of this move an action 10313 outputs the interrupt 114, defining a time point T06. The reading of the interrupt at an action 20314B causes the programme 203 to enter the signal 240 into store as the variable C'(i); see an action 20314C.

Figure 5C:
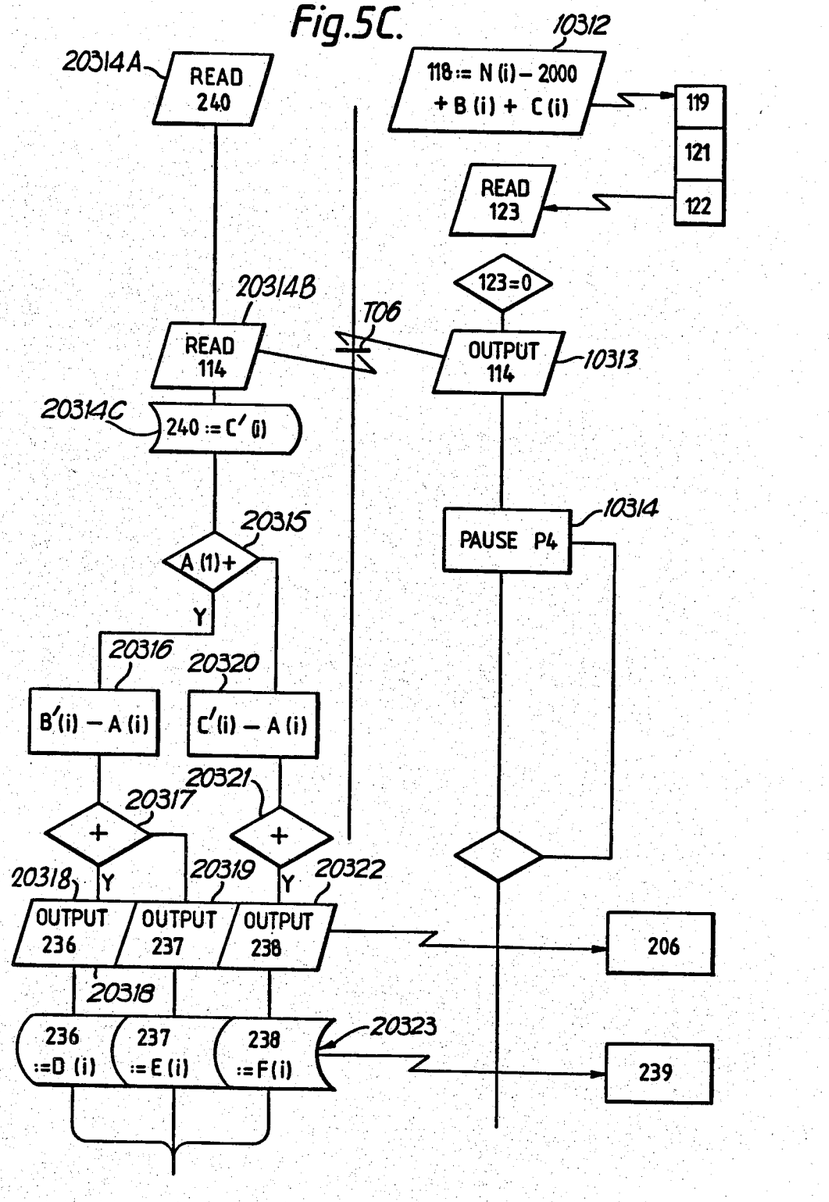
Figure 5D:
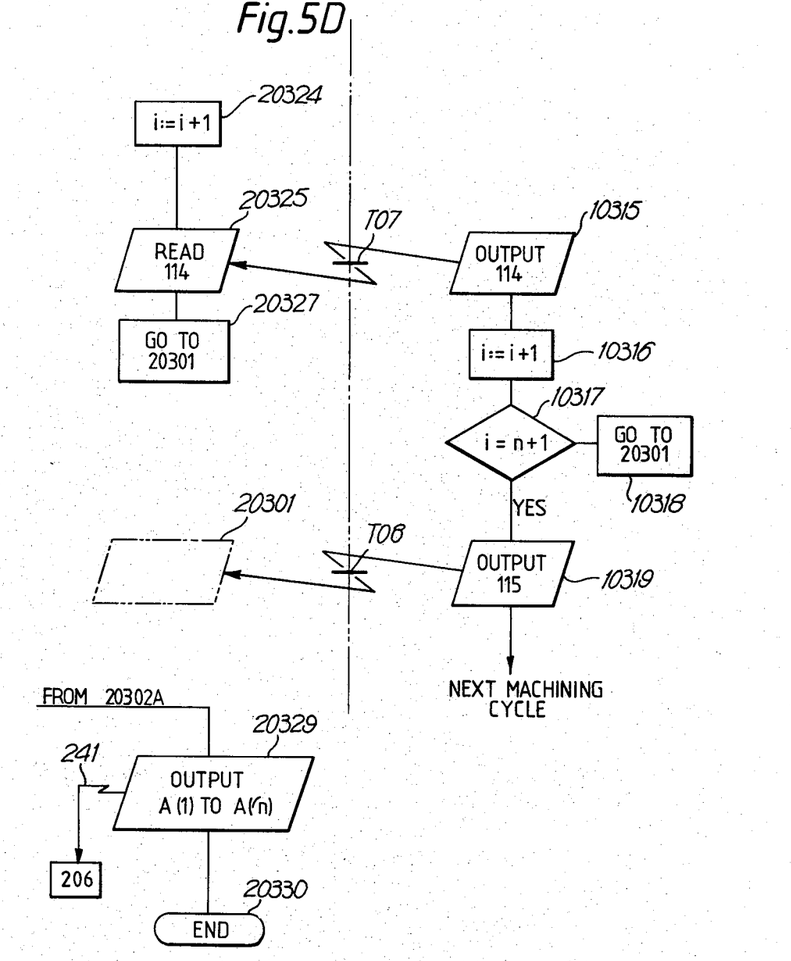

A pause P4 at an action 10314 now allows time for the programme 203 to carry out the following. If the error A(i) is positive, decision 20315, i.e. lies above the nominal position N(i), an action 20316 forms the sum B'(i)−A(i). If that sum is positive, decision 20317, i.e. if the top limit C is greater than the error A, then the component is obviously correct and an action 20318 outputs the "pass" signal 236. If the sum B'(i)−A(i) is negative, decision 20317, i.e. if the error is greater than the top limit, then the component is oversize and can be salvaged by a further machining operation. Accordingly an action 20319 outputs the "salvage" signal 237. If the error A was negative, decision 20315, i.e. lay below the nominal position N(i), an action 20320 forms the sum C'(i)−A(i) to see whether the error is greater than the tolerance. If so, decision 20321, an action 20322 outputs the "scrap" signal 238. The output at the actions 20318, 20319, 20322 is to the print-out 206. The respective signals 236, 237, 238 are stored at 20323 in the recording device 239. This complete the "limit comparison" phase of the programmes 103, 203.

Then follows the updating of the number (i) for all the variables A to F, action 20324, by which time the end of the pause P4 is reached. It is signified by output, at an action 10315, of the interrupt 114 at a time point T07.

The reading of the last interrupt 114 at an action 20325 causes the programme 203 to go back to the action 20301 at an action 20326 for the next cycle. An updating action 10316 for the number (i) in the programme 103 is followed by a decision 10317 to see whether (i) is now greater than (n). If not, the programme 103 goes back to action 20301. However, if (i) is greater than (n) the programme 103 outputs the terminal interrupt 115 at an action 10319, defining time point T08. This is read by the programme 203 at its action 20301 (FIG. 5A) and the decision 20302 then moves the programme, via the action 20302A, to the action 20329 (FIG. 5D) to output the variable A, i.e. A(1) to A(n), as the signal 241 to the print-out 206 and pass to the end of the programme at 20330. The operator can then input the variable to the unit 100 by means of the keyboard 108 to effect correction of the signal 118.

Such manual input of the correction signal is known per se and it is sufficient to say that the comparator 105 has, as part of the store 106, a buffer store connected to receive the signal 109, and the machining programme has instructions to add the signal 109 to the signal 118 so that the errors of the previous machining operation can be made good in the coming machining operation. When the signal 109 is typed out on the keyboard, some number such as (i) must of course be included to identify the different surfaces S. Thus, the keyboard input does not in principle differ from the variable A(i) as presented by the signal 241. It will be clear therefore that, subject only to the provision of the OR gate, the signal 241 can be read directly into the unit 100.

The measuring operation may be regarded generally in terms of of moving the probe to a first position N+2000 which is known and from there to a second position which is the unknown position of the surface S, the counter 204 being started at the first position by the miscellaneous function signal 114 and stopped at the second position by the probe signal 24. Alternatively, the probe may be moved until it engages the unknown position as the first position from which it is moved to the known position N+2000 as the second position, the counter being started by the signal 24 and stopped by the signal 114.

In yet another alternative, instead of using the position N+2000 as the known position, one may use the position N itself for this purpose, i.e. one can start the counter at the position N and stop it at the position S, or vice versa. However, using a position such as N+2000 as the first position has the advantage that the measuring operation can be completed by moving throughout in the same direction, i.e. toward the surface S.

The positions N−2000 and N−2000+B may be regarded as a third and a fourth position, both known, which are used to read a tolerance or range into the unit 200 for the purpose of comparison with the error A. The positions N−2000+B and N−2000+B+C may correspondingly be regarded as third and fourth positions.

The unit 100, the motors 17, 18 and the diffraction gratings 19, 20 may be regarded generally as an automatic means for moving the probe, the gratings 19, 20 being a first measuring means distinct from the second measuring means constituted by the counter 204.

I claim:

1. A method for measuring a dimension of a workpiece mounted on a numerically controlled machine tool having a probe for sensing the surface of said workpiece; automatic means for moving said probe relative to a datum, said automatic means including a first measuring means for producing a signal defining units of distance corresponding to the relative movement of said probe with respect to said datum; and a second measuring means coupled to said first measuring means for accumulating a count corresponding to the relative movement of said probe with respect to said datum; wherein the actual position of said workpiece surface is determined relative to a nominal position thereof, said nominal position being at a known distance from said datum, said method comprising the automatic and sequential steps of;

moving said probe to a first position, said first position being one of said actual and nominal positions of said workpiece surface;

initiating operation of said second measuring means to begin a count of the units of distance defined by the signal from said first measuring means when said probe attains said first position;

moving said probe to a second position, said second position being the other of said actual and nominal positions of said workpiece surface; and     terminating the count in said second measuring means when said probe attains said second position;

wherein the count accumulated by said second measuring means on termination thereof defines the actual distance of said workpiece surface from said nominal position.

2. A method according to claim 1 wherein said first position is the actual position of the surface of said workpiece.

3. A method according to claim 1 wherein said first position is the nominal position of the surface said workpiece.

4. A method of measuring a dimension of a workpiece mounted on a numerically controlled machine tool having a probe for sensing the workpiece surface; automatic means for moving the probe relative to a datum, said automatic means including a first measuring means for producing a signal defining units of distance corresponding to the relative movement of said probe with respect to said datum; and a second measuring means coupled to said first measuring means for accumulating a count corresponding to the relative movement of said probe with respect to said datum; wherein the actual position of said workpiece surface is determined relative to a nominal position thereof, said nominal position being at a first known distance from said datum, said method comprising the automatic and sequential steps of:

moving said probe to a first position, said first position being one of said actual position of said workpiece surface and a position having a second known distance from said nominal position of said workpiece surface;

initiating operation of said second measuring means to begin a count of the units of distance defined by the signal from said first measuring means when said probe attains said first position;

moving said probe to a second position, said second position being the other of said actual position of said workpiece and said position having a second known distance from said nominal position of said workpiece surface; and terminating the count in said second measuring means when said probe attains said second position;

wherein the count accumulated by said second measuring means on termination thereof is the difference between said second known distance and the distance between said actual and nominal positions, and the actual position is determined as the difference between said second known distance and the count of said second measuring means upon termination thereof.

5. A method according to claim 4 wherein said first position is said actual position of the surface of said workpiece.

6. A method according to claim 4 wherein said first position is the position having a second known distance from the nominal position of said workpiece surface.

7. A method according to claim 1 or 4 further comprising the subsequent automatic and sequential steps of:
moving said probe to a third position having a third known distance from said nominal position;
initiating operation of said second measuring means to begin a second count when said probe attains said third position;
moving said probe to a fourth position having a fourth known distance from said nominal position;
terminating said second count in said second measuring means when said probe attains said fourth position, the distance between said third and fourth positions being a range within which said actual position of said workpiece surface is required to lie; and
comparing said actual position with said third and fourth positions to determine whether said actual position lies within said range.

8. A method according to claim 1 wherein operation of said second measuring means responsive to attainment of said actual position and said nominal position are initiated respectively by said probe and said automatic means.

9. A method according to claim 4 wherein operation of said second measuring means responsive to attainment of said actual position and of said position having a second known distance from said nominal position are initiated respectively by said probe and said automatic means.

10. A method according to claim 1 or 4 for use in a said machine tool wherein said probe is movable by said automatic means towards said workpiece surface to a position at which said surface is sensed by the probe and movable beyond the latter position, the method comprising the further steps of:

determining a third and a fourth position lying at opposite sides of said nominal position and having known distances therefrom, the third and fourth positions lying at opposite sides of a range within which said actual position of said workpiece is required to lie, the third known position lying clear of the workpiece;

loading said measuring means with a number corresponding to the distance between the third known position and the nominal position;

moving said probe toward the third position from a side thereof remote from the workpiece and toward the fourth position;

initiating operation of the measuring means to begin a count-down of the units of distance defined by said signal when said probe attains the third position;

reversing movement of the probe to move the probe in the direction away from the workpiece; and terminating the count when said probe is at a position of sensing said surface during one of the movements toward and away from said workpiece.

11. A numerically controlled machine tool for measuring the position of a surface of a workpiece mounted on said machine tool, said machine tool having a datum establishing a reference position and comprising:

a probe for sensing the surface of said workpiece;
automatic means for moving said probe between a first position of known distance from said datum and a second position of unknown distance from said datum, said second position being the actual position of said workpiece surface, said automatic means including a continually operative first measuring means for producing a signal which defines units of distance corresponding to the relative movement of said probe with respect to said datum;

second measuring means responsive to said signal produced by said first measuring means for providing a measurement corresponding to the relative movement of said probe;

means coupled to said second measuring means and said probe for initiating operation of said second measuring means when said probe attains one of said first and second positions; and means coupled to said second measuring means and responsive to said probe attaining the other one of said first and second positions for terminating the operation of said second measuring means whereby said second measuring means contains a measurement that is used to determine said actual position of said workpiece surface relative to said first position.

12. A machine tool according to claim 11 wherein said first measuring means produces an output signal having cycles defining units of distance moved by said probe; said probe comprises means for producing a step signal responsive to said probe sensing said workpiece surface; and said second measuring means comprises a counter for counting said cycles of said first measuring means, the operation of said counter being responsive to said step signal.

13. A machine tool according to claim 11 wherein said automatic means produces a predetermined function signal in response to said probe attaining said first position, and said second measuring means is coupled to said predetermined function signal and responds thereto by one of the actions of initiating and terminating the operation of said second measuring means.

14. A numerically controlled machine tool comprising:
- a workpiece support;
- a slide;
- drive means for moving said slide and said support relative to each other;
- a probe for sensing a surface of a workpiece connected to said support, said probe being mounted on said slide and having means for generating a probe signal responsive to sensing said workpiece surface;
- movement-sensing means connected to sense relative movement of said support and said slide, said movement-sensing means being adapted to generate a corresponding movement-defining signal;
- a main control unit having first programmed means programmed to output a signal to said drive means to move said probe and support to a predetermined relative position, said first programmed means being further programmed to output a predetermined function signal responsive to attainment of a said predetermined relative position; and
- an auxiliary control unit having measuring means responsive to said movement-sensing means for measuring said movement, said auxiliary control unit further having means for starting said measuring means responsive to one of said predetermined function signal and said probe signal, and said auxiliary control unit having means for stopping said measuring means responsive to the other one of said predetermined function signal and said probe signal.

* * * * *